Jan. 28, 1964   E. R. ANDERSON   3,119,587
HOSE HOLDING FIXTURE
Filed Oct. 8, 1962
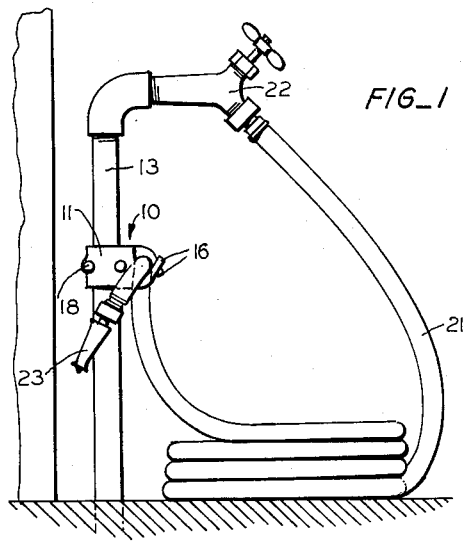
FIG_1
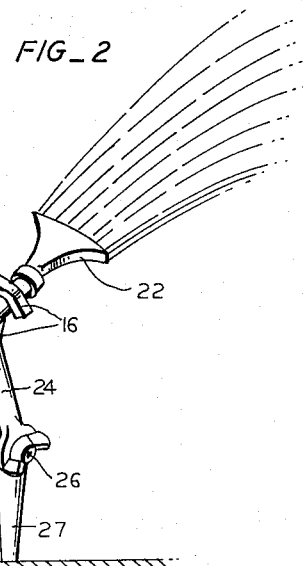
FIG_2
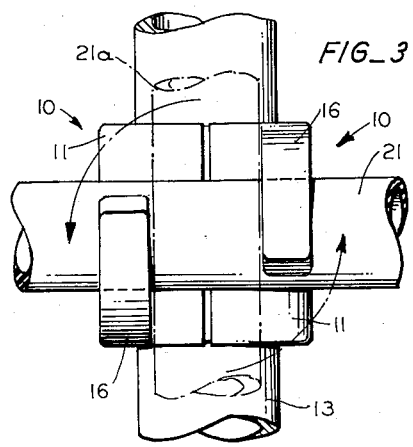
FIG_3
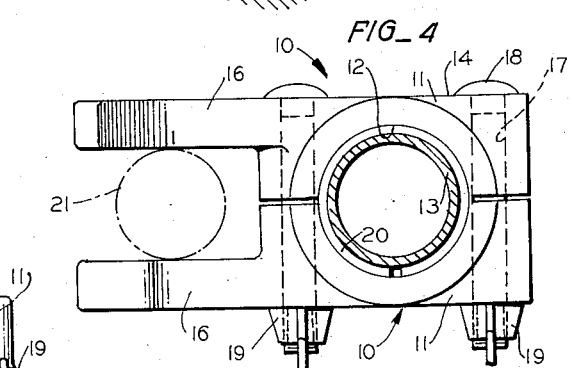
FIG_4
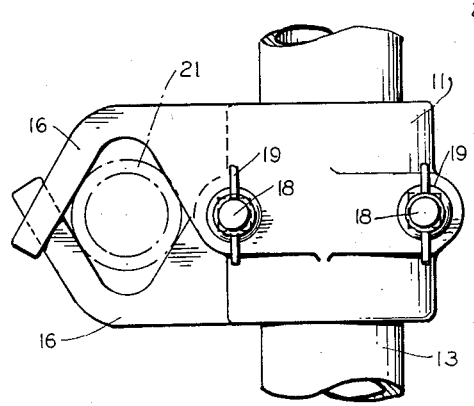
FIG_5
INVENTOR.
EARL R. ANDERSON
BY *Allen and Chromy*
ATTORNEYS 3,119,587
HOSE HOLDING FIXTURE
Earl R. Anderson, 1900 Pollard Road, Los Gatos, Calif.
Filed Oct. 8, 1962, Ser. No. 229,018
4 Claims. (Cl. 248—75)

The present invention relates to fixtures for holding hose such as a garden hose which fixture can be readily attached and detached to a cylindrical support such as a water pipe or the like.

It is a general object of the invention to provide a hose holding fixture which is made up of duplicate halves constructed so that the two fixture halves can be readily clamped onto a cylindrical object such as a water pipe at a desired position thereon and will provide a pair of supporting fingers which are spaced apart to allow the hose to be introduced in upright position and then rotated to 90 degrees into the position to be held.

Other objects and advantages of the invention will be apparent from the following description of a preferred embodiment hereof taken in conjunction with the attached drawing in which:

FIG. 1 is an elevational view of the fixture as attached to the pipe of a water hydrant and having the hose held therein;

FIG. 2 is a perspective elevational view of the fixture as attached to a cylindrical watering support;

FIG. 3 is an elevational view of the fixture on a pipe;

FIG. 4 is a plan view of the fixture on a pipe; and

FIG. 5 is an elevational view taken at right angles to the view of FIG. 3 to illustrate details of construction.

Referring to FIGS. 3, 4 and 5 the hose holding fixture comprises a pair of duplicate halves 10, each consisting of a body portion 11 having a semi-cylindrical recess 12 therein to fit against a cylindrical object such as a pipe 13. The flush outer wall 14 of each half is extended at one side to provide a U-shaped or V-shaped projecting finger 16 which extends from one end in parallel relation with the face 14 so that it provides a recessed element spaced from the body portion 11.

Each half is provided with aligned apertures 17 through which fastening bolts 18 extend and are secured in place by means of wing nuts 19. A resilient split cylindrical sleeve 20 is provided around the support pipe 13 and within the recesses 12 to provide a secure but yieldable mounting on the pipe 13.

It will be seen that when the duplicate halves are assembled on a cylindrical object such as a pipe, for example, and clamped in place, the respective fingers 16 both project in the same direction with their U-shaped openings opposed to each other so that they will embrace a horizontally extending portion of hose 21. These two fingers 16 are spaced apart sufficiently so that when the hose is in a vertical position it can be inserted between the fingers and into alignment with the U-shaped or V-shaped recesses therein and then twisted 90 degrees from a vertical position to a horizontal position, as shown in full lines in FIG. 3 to be retained.

Referring to FIG. 1 there is shown a hydrant 22 having a hose 21 attached thereto, and the hose holding fixture 10 is secured to the pipe in an elevated position so as to hold the hose near the nozzle 23 thereof to maintain an elevated position where it can be readily reached without stooping to the ground.

In FIG. 2 the hose holding FIGURE 10 clamped to a support element or pipe 24, forming part of the watering fixture and connected by a pivoted joint 26 to a spike element 27 which can be inserted in the ground so that hose 21 can be held therein with the spray element 22 in the desired watering position.

While I have shown and described a preferred embodiment of the invention, it will be apparent that the invention is capable of variation and modification from the form shown so that the scope thereof should be limited only by the scope of the claims appended hereto.

I claim:

1. A hose holding fixture for clamping attachment to a pipe or the like, comprising a pair of duplicate halves, each half having a body portion with a semi-cylindrical cavity formed therein, a substantially U-shaped finger projecting from said body portion at one end thereof and bending reversely in overlapping relation with the body portion, and means formed in the body portion to receive fasteners.

2. A hose holding fixture for clamping attachment to a pipe or the like, comprising a pair of duplicate halves, each half having a body portion with a semi-cylindrical pipe-receiving cavity formed therein, an extension projecting from said body portion at one side thereof and providing a hose holding seat or recess, and means for securing said body portions together with said seats opposed to each other but spaced laterally apart to provide for insertion of a hose between said extensions and the turning of said hose thru an angle to engage said seats.

3. A hose holding fixture for clamping attachment to a pipe or the like, comprising a pair of duplicate halves, each half having a body portion with a semi-cylindrical pipe-receiving cavity formed therein, an extension projecting from said body portion at one side thereof and providing a hose holding seat or recess, means for securing said body portions together with said seats opposed to each other but spaced laterally apart to provide for insertion of a hose between said extensions and the turning of said hose thru an angle to engage said seats and resilient liner means seated in said cavities for engaging a pipe.

4. A hose holding fixture for clamping attachment to a pipe or the like, comprising a pair of duplicate halves, each half having a body portion with a semi-cylindrical pipe-receiving cavity formed therein, an extension projecting from said body portion at one side thereof and providing a hose holding seat or recess, means for securing said body portions together with said seats opposed to each other but spaced laterally apart to provide for insertion of a hose between said extensions and the turning of said hose thru an angle to engage said seats, and resilient liner means seated in said cavities for engaging a pipe comprising a split resilient tube.

References Cited in the file of this patent

UNITED STATES PATENTS

| 471,156 | Tinsley | Mar. 22, 1892 |
| 961,234 | Hoover | June 14, 1910 |
| 2,141,849 | Baer | Dec. 27, 1938 |